3,060,207
PROCESS FOR THE MANUFACTURE OF Δ$^{9(11)}$-16-ALKYL-17α-HYDROXY-PREGNENE-20-ONES
Albert Wettstein, Riehen, and Charles Meystre, Basel, Switzerland, assignors to Ciba Corporation, a corporation of Delaware
No Drawing. Filed Jan. 21, 1960, Ser. No. 3,742
Claims priority, application Switzerland Jan. 22, 1959
6 Claims. (Cl. 260—397.45)

This invention provides a new process for the manufacture of Δ$^{9(11)}$-16-alkyl-17α-hydroxy-pregnane-20-ones and in this process especially the selective reduction of the 11-oxo group in 16-alkyl-17α-hydroxy-pregnane-11:20-diones.

The Δ$^{9(11)}$-16-alkyl-17α-hydroxy-pregnene-20-ones obtained by the process of the invention are valuable intermediate products for the synthesis of 16-alkylated corticosteroids, for example, for the manufacture of the highly active compound 16α-methyl-9α-fluoro-prednisolone.

The reduction of a 11-oxo group to the 11β-hydroxy group is an important step in the synthesis of the above mentioned hormones. It has hitherto been carried out in the case of suitable intermediate products by the temporary protection of reactive oxo groups present, especially those in the 3- and/or 20-position, then reducing the 11-oxo group with a complex metal hydride, for example, with lithium-aluminum hydride or sodium boronhydride, and finally removing the protective groups. For the purpose of temporary protection there have been used principally ketals, especially ethylene-ketals or nitrogen derivatives, for example, the semi-carbazones. The introduction and removal of the protective groups always necessitates additional steps in the process and reduces the yield of the desired final product. It is known that an 11-oxo group can also be reduced to the 11β-hydroxyl group by means of catalytically activated hydrogen. As, however, the aforesaid protective groups are not suitable in such a reaction, it has not been possible to carry out the selective reduction of pregnane-polyketones, for example, pregnane-11:20-diones, by catalytic hydrogenation.

The present invention is based on the unexpected observation that Δ$^{9(11)}$-16-alkyl-17α-hydroxy-pregnene-20-ones can be obtained in an extraordinarily simple manner by treating a 16-alkyl-, and especially a 16-methyl-17α-hydroxy-pregnane-11:20-dione, which may contain in the 21-position a free or esterified hydroxyl group, with hydrogen in the presence of a noble metal catalyst, and then splitting off the resulting 11β-hydroxyl group to form a 9:11-double bond.

For the catalytic reduction of the 11-oxo group there are used catalysts capable of reducing oxo groups to hydroxyl groups, and advantageously active noble metal catalysts, for example, a platinum catalyst. The reduction is carried out in a solvent, for example, in a lower fatty acid, such as acetic acid, propionic acid or the like, under atmospheric pressure. In order to accelerate the reaction the temperature and/or the pressure of the hydrogen may be raised. The addition of an acid, for example, oxalic acid, chloracetic acid or the like, also accelerates the absorption of hydrogen. When the aforesaid starting materials are used the absorption of gas ceases after the absorption of 1 molar equivalent and the 20-oxo group is unexpectedly not attacked.

The 11β-hydroxyl group formed by the catalytic reduction is then, if desired, after the esterification of a 3-hydroxyl group, split off by a method in itself known, for example, with phosphorus oxychloride and pyridine, or with bromosuccinimide-pyridine and sulfur dioxide, thionyl chloride and pyridine. It has been found that the splitting off of the 11β-hydroxyl group in the process of this invention can also be carried out without protecting the 3-hydroxyl group by reacting the 3:11β-dihydroxy-compound with a strong acid, especially, for example, perchloric acid. The treatment with acid is advantageously carried out in the presence of an ether, for example, a dialkyl ether, for example, diethyl ether, tetrahydrofuran, dioxane, glycol dimethyl ether or the like. If the perchloric acid is added in glacial acetic acid during the catalytic hydrogenation, the splitting off of water takes place at the same time, and the resulting 9:11-double bond is subsequently reduced in the reaction medium and reactive hydroxyl groups are acetylated. In this case there are obtained 11-desoxy-compounds.

In the resulting 16-alkyl-11β:17α-dihydroxy-pregnane-20-ones unsubstituted in the 21-position a 21-acyloxy group is introduced in known manner by bromination followed by the exchange of the bromine atom for an acyloxy group. A free 3-hydroxyl group can then be oxidized to the 3-oxo group, for example, by means of bromoacetamide or bromo-succinimide or pyridine-chromic acid complex. The conversion of the resulting Δ$^{9(11)}$-16-alkyl-, especially-16α-methyl-17α-hydroxy - 21 - acyloxy-pregnene-3:20-diones into the highly active compound 16α-methyl-9α-fluoro-prednisolone is brought about by introducing two double bonds in the 1:2- and 4:5-positions by means of selenium dioxide. The conversion of the resulting Δ$^{1,4,9}$-triene into 16α-methyl-9α-fluoro-prednisolone is known.

The 16-alkyl-17α-hydroxy-pregnane-11:20-diones used as starting materials are prepared from the corresponding Δ$^{16}$-pregnene-11:20-diones by additive combination with an alkyl-Grignard compound, enol-acetylation, peracid-oxidation and hydrolysis. The corresponding 21-acyloxy-compounds are obtained by bromination in the 21-position and reaction with a metal acylate. Especially advantageous processes for preparing the starting materials to be used are described in U.S. patent application No. 845,078, filed October 8, 1959, No. 824,202, filed July 1, 1959 and No. 824,210, filed July 1, 1959 all three by Albert Wettstein et al. Especially suitable starting materials are, for example, 3β:17α-dihydroxy - 16α - methyl-allopregnane-11:20-dione, 3β:17α-dihydroxy-21-acyloxy-, for example, 21-acetoxy-16α-methyl-allopregnane-11:20-diones, 3α:17α-dihydroxy-16α-methyl-pregnane-11:20-dione, 3α:17α-dihydroxy-21-acyloxy-, for example, -21-acetoxy- 16α-methyl-pregnane-11:20-diones and also the corresponding 16β-methyl-compounds.

The 16-alkyl-11β:17α:21-trihydroxy-pregnane-20-ones obtained by the hydrogenation by the process of this invention are new.

The following examples illustrate the invention:

*Example 1*

2 grams of platinum oxide are prehydrogenated in a mixture of 400 cc. of glacial acetic acid and 4 grams of oxalic acid. 10 grams of 3β:17α - dihydroxy - 16α - methyl - 21 - acetoxy - allopregnane - 11:20 - dione are added to the suspension and hydrogenation is continued at 25–30° C. After about 30–40 hours the hydrogenation ceases. The solution is filtered (if required, after the addition of chloroform for dissolving precipitated hydrogenation product), to remove the platinum, a small amount of water is added to the filtrate, and the latter is concentrated in vacuo, whereupon crystals gradually separate out. The crystals are filtered off with suction and washed with ether. The mother liquors are then diluted with ethyl acetate, washed with water, dilute sodium carbonate solution and water, dried and evaporated. The crystalline residue so obtained and also the crystallizate first obtained are recrystallized from acetone or a mixture of acetone and ether, whereby 3β:11β:17α - trihydroxy - 16α - methyl - 21 - acetoxy - allopregnane - 20- one melting at 230–236° C. is obtained. In the infra-red spectrum (in Nujol) it exhibits bands, inter alia, at 2.82μ (shoulder), 2.87μ, 5.74μ (shoulder), 5.78μ, 7.05μ, 7.20μ, 7.80μ, 8.00μ, 8.85μ and 9.65μ.

*Example 2*

1 gram of 3β:11β:17α - trihydroxy - 16α - methyl - 21 - acetoxy - allopregnane - 20 - one is dissolved in 30 cc. of tetrahydrofuran and a few drops of perchloric acid are added. The solution is then boiled under reflux for one hour, concentrated in vacuo, and ethyl acetate is added. The ethyl acetate solution is washed with water, dried and evaporated in vacuo. From the residue there is obtained by recrystallization from methanol $\Delta^{9(11)}$ - 3β:17α-dihydroxy - 16α - methyl - 21 - acetoxy - allopregnene-20 - one. It melts at 158° C., then crystallizes again to prisms which finally melt at 200° C. In the infra-red spectrum (in methylene chloride) it exhibits bands inter alia at 2.75μ, 5.70μ, 5.76μ, 7.20μ (shoulder), 7.29μ, 8.75μ and 9.65μ.

*Example 3*

0.5 gram of $\Delta^{9(11)}$ - 3β:17α - dihydroxy - 16α - methyl-21 - acetoxy - allopregnene - 20 - one are dissolved in 20 cc. of methylene chloride and 1 cc. of pyridine. 0.5 gram of N-bromosuccinimide is added to the solution and the whole is allowed to stand for 16 hours at 20° C. The methylene chloride solution is then washed with a dilute solution of sodium thiosulfate, water, dilute hydrochloric acid and water, then dried and evaporated in vacuo. The residue is crystallized from a mixture of acetone and ether, whereby $\Delta^{9(11)}$ - 16α - methyl - 17α - hydroxy - 21-acetoxy - allopregnene - 3:20 - dione melting at 215–219° C. is obtained.

By treating the $\Delta^{9(11)}$ - 3β:17α - dihydroxy - 16α - methyl - 21 - acetoxy - allopregnene - 20 - one with chromium trioxide in pyridine, there is also obtained $\Delta^{9(11)}$ - 16α-methyl - 17α - hydroxy - 21 - acetoxy - allopregnene-3:20 - dione melting at 215–219° C.

*Example 4*

1.5 g. of 11β:17α - dihydroxy - 16α - methyl - 21 - acetoxy - allopregnane - 3:20 - dione are dissolved in 100 cc. of tetrahydrofuran, treated with 1 cc. of acetic acid and 1 cc. of perchloric acid, and the solution refluxed for 4–5 hours. Water is added and the solution evaporated under reduced pressure. The residue is taken up in ethyl acetate, the ethyl acetate solution washed with a dilute sodium carbonate solution and water, dried and evaporated in vacuo. The residue can be recrystallized from a mixture of acetone and ether, 873 mg. of the pure $\Delta^{9(11)}$ - 16α - methyl - 17α - hydroxy - 21 - acetoxy - allopregnene - 3:20 - dione of melting point 219–224° C. being obtained.

What is claimed is:

1. Process for the manufacture of 11β - hydroxy - 16-methyl - 17α - hydroxy - pregnane - 20 - ones, wherein a member selected from the group consisting of a 16 - methyl - 3:17 - dihydroxy-pregnane - 11:20 - dione and their corresponding 5α isomers is treated with hydrogen in the presence of a noble metal catalyst.

2. Process according to claim 1, wherein the catalyst used is a platinum catalyst.

3. Process according to claim 1, wherein the reduction is performed in a lower fatty acid in the presence of a strong organic carboxylic acid.

4. Process for dehydrating a member selected from the group consisting of an 3,11β - dihydroxy - 16 - alkyl-17α - hydroxy - pregnene - 20 - one and a corresponding 5α isomer to produce the corresponding $\Delta^{9(11)}$-dehydrosteroid wherein there is used as dehydrating agent perchloric acid.

5. Process of claim 4, wherein the dehydration with perchloric acid is carried out in the presence of an ether.

6. Process for the manufacture of $\Delta^{9(11)}$ - 3β - hydroxy-16 - methyl - 17α - hydroxy - pregnene - 20 - ones, wherein a member selected from the group consisting of a 16-methyl - 3β,17 - dihydroxy - pregnane - 11:20 - dione and a corresponding 5α isomer is treated with hydrogen in the presence of a noble metal catalyst and perchloric acid.

References Cited in the file of this patent

UNITED STATES PATENTS

| | | |
|---|---|---|
| 2,783,254 | Gould et al. | Feb. 26, 1957 |
| 2,944,070 | Kollonitsch et al. | July 5, 1960 |

OTHER REFERENCES

Arth et al.: 80 J.A.C.S., 3161–62 (1958).
Caspi: J. Org. Chem., vol. 24 (1959), pp. 669–73.